United States Patent
Guo et al.

(10) Patent No.: US 10,755,394 B2
(45) Date of Patent: Aug. 25, 2020

(54) IMAGE PROCESSING METHOD AND DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Jun Guo, Beijing (CN); Xibin Shao, Beijing (CN); Ming Chen, Beijing (CN); Shou Li, Beijing (CN); Jieqiong Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 273 days.

(21) Appl. No.: 15/768,908

(22) PCT Filed: Oct. 27, 2017

(86) PCT No.: PCT/CN2017/108018
§ 371 (c)(1),
(2) Date: Apr. 17, 2018

(87) PCT Pub. No.: WO2018/149172
PCT Pub. Date: Aug. 23, 2018

(65) Prior Publication Data
US 2019/0080441 A1    Mar. 14, 2019

(30) Foreign Application Priority Data

Feb. 17, 2017    (CN) .......................... 2017 1 0085931

(51) Int. Cl.
*G06K 9/00* (2006.01)
*G06T 5/40* (2006.01)
(Continued)

(52) U.S. Cl.
CPC ................ *G06T 5/40* (2013.01); *G06T 5/007* (2013.01); *G06T 5/009* (2013.01); *G06T 7/11* (2017.01); *G06T 2207/20021* (2013.01)

(58) Field of Classification Search
CPC ....................................................... G06T 5/40;
G06T 5/007; G06T 5/009; G06T 5/50;
G06T 2207/10016
(Continued)

(56) References Cited

U.S. PATENT DOCUMENTS 9,299,317 B2 *    3/2016    Ward .......................... G06T 5/40
9,669,585 B2 *    6/2017    Hemani ................. B29C 64/386
(Continued)

FOREIGN PATENT DOCUMENTS

CN    101340510 A    1/2009
CN    101706953 A    5/2010
(Continued)

OTHER PUBLICATIONS

Search Report and Written Opinion for International Application No. PCT/CN2017/108018 dated Jan. 25, 2018.
(Continued)

*Primary Examiner* — Charlotte M Baker
(74) *Attorney, Agent, or Firm* — Calfee, Halter & Griswold LLP

(57) ABSTRACT

An image processing method and device is configured to convert an obtained image to be processed into a grayscale chrominance YUV mode image; determine an equilibrium mapping curve of a whole grayscale image according to the grayscale image in the YUV mode image; divide the whole grayscale image into a plurality of sub-regions, and determine a mapping restriction parameter for each pixel in each of the sub-regions; adjust a grayscale value of each pixel in the grayscale image according to the determined equilibrium mapping curve of the whole grayscale image and the map-
(Continued)

ping restriction parameter of each pixel in each of the sub-regions; and convert the adjusted grayscale image into an image of original mode. an image is processed using an equilibrium mapping curve and a plurality of mapping restriction parameters present the image details well and greatly reduce the calculation amount.

20 Claims, 6 Drawing Sheets

(51) Int. Cl.
 *G06T 7/11* (2017.01)
 *G06T 5/00* (2006.01)
(58) Field of Classification Search
 USPC ....... 382/169, 190, 162, 154, 243, 239, 128; 345/589, 419, 60; 348/229.1
 See application file for complete search history.

(56) References Cited

U.S. PATENT DOCUMENTS

| | | | |
|---|---|---|---|
| 2002/0090140 A1* | 7/2002 | Thirsk | G06T 9/00 382/239 |
| 2007/0268534 A1 | 11/2007 | Duan et al. | |
| 2008/0123962 A1* | 5/2008 | Moroo | G06T 1/005 382/190 |
| 2014/0270521 A1 | 9/2014 | Yang et al. | |
| 2014/0348428 A1 | 11/2014 | Lee | |
| 2018/0005359 A1 | 1/2018 | Deng | |

FOREIGN PATENT DOCUMENTS

| | | |
|---|---|---|
| CN | 103810681 A | 5/2014 |
| CN | 104574326 A | 4/2015 |
| CN | 104952069 A | 9/2015 |
| CN | 105225210 A | 1/2016 |
| CN | 105407296 A | 3/2016 |
| CN | 106355556 A | 1/2017 |
| EP | 2323373 A1 | 5/2011 |
| JP | 2008092052 A | 4/2008 |

OTHER PUBLICATIONS

First Office Action for Chinese Patent Application No. 201710085931.X dated Feb. 6, 2020.

* cited by examiner

IMAGE PROCESSING METHOD AND DEVICE

RELATED APPLICATIONS

The present application is the U.S. national phase entry of PCT/CN2017/108018 with an International filing date of Oct. 27, 2017, which claims the benefit of Chinese Patent Application No. 201710085931.X, filed on Feb. 17, 2017, the entire disclosures of which are incorporated herein by reference.

TECHNICAL FIELD

The present invention relates to the field of video image processing, and more particular to an image processing method and device.

BACKGROUND ART

In order to enhance image contrast and dynamic range, the histogram equalization algorithm is usually used for image processing, wherein the histogram equalization algorithm mainly has two implementations: one is the global histogram equalization algorithm, i.e., an image to be processed is holistically adjusted by an equilibrium mapping curve and a mapping restriction parameter that relates to information abundance of the image, in such a way to not only avoid image deterioration while enhancing contrast, but also reduce calculation amount as much as possible; however, in order to prevent such an issue as the short board effect, the details of the processed image usually cannot be enhanced most properly; and the other is the local histogram equalization algorithm, i.e., an image is divided into several areas, the image to be processed in each area is adjusted by an equilibrium mapping curve and a mapping restriction parameter that relates to information abundance of the area, and the equilibrium mapping curve in each area is decided by its surrounding areas. The greatest advantage of this method is that the details of an image can be enhanced most properly; however, it tends to result in a huge amount of calculation for perfectly highlighting the details.

SUMMARY

In view of the problems in the prior art, how to perfectly highlight image details while achieving high-speed and effective calculation is a technical problem that needs to be solved urgently by those skilled in the art.

To solve or alleviate at least one defect in the prior art, the present disclosure provides an image processing method, an image processing device, a computer readable storage medium and a calculation apparatus, so as to solve the problem in the prior art of how to perfectly highlight image details while achieving high-speed and effective calculation by means of the global histogram equalization algorithm and the local histogram equalization algorithm.

According to one aspect, there is provided an image processing method, comprising the steps of: determining an equilibrium mapping curve of a whole grayscale image according to the grayscale image in a YUV mode image; dividing the whole grayscale image into a plurality of sub-regions, and determining a mapping restriction parameter for each pixel in each of the sub-regions; and adjusting a grayscale value of each pixel in the grayscale image according to the determined equilibrium mapping curve of the whole grayscale image and the mapping restriction parameter of each pixel in each of the sub-regions.

In an embodiment, the image processing method further comprises the steps of: converting an image to be processed into a grayscale chrominance YUV mode image; and converting the adjusted grayscale image into an image of original mode.

In an embodiment, the step of determining an equilibrium mapping curve of a whole grayscale image according to a grayscale image in a YUV mode image further comprises the steps of:

determining a pixel depth and a grayscale histogram of the grayscale image in the YUV mode image, and a grayscale value of each pixel in the grayscale image; and calculating the equilibrium mapping curve of the whole grayscale image by the following formula:

$$S_k = D \times \sum_{i=0}^{k} \frac{H(i)}{SUM}, 0 \leq k \leq D$$

Wherein, k is the grayscale value of a pixel in the grayscale image, $S_k$ is the mapping value of a pixel with a grayscale value of k in the grayscale image, SUM is the total number of the pixels in the grayscale image, H(i) is the number of the pixels with a grayscale value of i in the grayscale image, and D is the pixel depth of the grayscale image.

In an embodiment, the step of dividing the whole grayscale image into a plurality of sub-regions, and determining a mapping restriction parameter for each pixel in each of the sub-regions further comprises the steps of:

dividing the whole grayscale image into a plurality of transitional regions, and determining a transitional mapping restriction parameter of each of the transitional regions; and dividing each of the transitional regions into a plurality of sub-regions, and determining a mapping restriction parameter for each pixel in each of the sub-regions according to the determined transitional mapping restriction parameter of each of the transitional regions and a set linear interpolation calculation rule.

In an embodiment, the step of determining a transitional mapping restriction parameter of each of the transitional regions specifically comprises the steps of:

determining a grayscale mean value and a grayscale standard deviation of each of the transitional regions; and calculating the transitional mapping restriction parameter of each of the transitional regions by the following formula:

$$L_{1x} = [M_x \times N_{min1} + (T_1 - M_x) \times N_{max1}]/D$$

$$L_{2x} = [S_x \times N_{min2} + (T_2 - S_x) \times N_{max2}]/D$$

$$L_x = \sqrt{L_{1x} \times L_{2x}}$$

Wherein, x is the serial number of a transitional region, $M_x$ is the grayscale mean value of the x-th transitional region, $S_x$ is the grayscale standard deviation of the x-th transitional region, $N_{min1}$ and $N_{max1}$ are respectively the preset minimum limit value and maximum limit value corresponding to the grayscale mean value of each of the transitional regions, $N_{min2}$ and $N_{max2}$ are respectively the preset minimum limit value and maximum limit value corresponding to the grayscale standard deviation of each of the transitional regions, $T_1$ is a preset limit threshold corresponding to the grayscale mean value of each of the transitional regions, $T_2$ is a preset limit threshold corresponding to the grayscale standard deviation of each of the transitional regions, D is the pixel depth of the grayscale image, $L_{1x}$ is a transitional mapping restriction parameter corresponding to the grayscale mean value $M_x$ of the x-th transitional region, $L_{2x}$ is a transitional mapping restriction parameter corresponding to the grayscale standard deviation $S_x$ of the x-th transitional region, and $L_x$ is the transitional mapping restriction parameter of the x-th transitional region.

In an embodiment, the step of determining a mapping restriction parameter for each pixel in each of the sub-regions according to the determined transitional mapping restriction parameter of each of the transitional regions and a set linear interpolation calculation rule further comprises the steps of:

determining a category of each of the sub-regions according to the position of each of the sub-regions in the grayscale image, the category comprising: sub-regions located in four corners of the grayscale image, sub-regions located on the borders, except the four corners, of the grayscale image, and sub-regions located in other space, except on the borders, of the grayscale image;

determining a mapping restriction parameter for each pixel in the sub-regions located in the four corners of the grayscale image as the transitional mapping restriction parameter of the transitional region it belongs to according to the determined transitional mapping restriction parameter of each of the transitional regions;

determining a mapping restriction parameter for each pixel in the sub-regions located on the borders, except the four corners, of the grayscale image according to the determined transitional mapping restriction parameter of each of the transitional regions and according to a preset uni-linear interpolation calculation rule; and determining a mapping restriction parameter for each pixel in the sub-regions located in other space, except on the borders, of the grayscale image according to the determined transitional mapping restriction parameter of each of the transitional regions and according to a preset bi-linear interpolation calculation rule.

In an embodiment, the step of determining a mapping restriction parameter for each pixel in the sub-regions located on the borders, except the four corners, of the grayscale image according to the determined transitional mapping restriction parameter of each of the transitional regions and according to a preset uni-linear interpolation calculation rule further comprises the step of:

calculating a mapping restriction parameter for each pixel in the sub-regions located on the borders, except the four corners, of the grayscale image by the following formula:

$$\lambda_{tr} = \frac{a \times L_n + b \times L'_n}{a + b}$$

Wherein, n is the serial number of the transitional region to which the pixel to be calculated belongs, t is the serial number of the sub-region to which the pixel to be calculated belongs, r is the serial number of the pixel to be calculated in the t-th sub-region, $L_n$ is the transitional mapping restriction parameter of the n-th transitional region, n' is the serial number of the transitional region located on the borders of the grayscale image and closest to the t-th sub-region, Ln' is the transitional mapping restriction parameter of the n'-th transitional region, a is the distance between the pixel to be calculated and the median of the n'-th transitional region, b is the distance between the pixel to be calculated and the median of the transitional region to which it belongs, and $\lambda_{tr}$ is the mapping restriction parameter of the pixel to be calculated.

In an embodiment, the step of determining a mapping restriction parameter for each pixel in the sub-regions located in other space, except on the borders, of the grayscale image according to the determined transitional mapping restriction parameter of each of the transitional regions and according to a preset bi-linear interpolation calculation rule further comprises the step of:

calculating a mapping restriction parameter for each pixel in the sub-regions located in other space, except on the borders, of the grayscale image by the following formula:

$$T_{pz} = \frac{c \times L_x + d \times L'_x}{c + d}$$

$$T_{qz'} = \frac{c' \times L_m + d' \times L'_m}{c' + d'}$$

$$W_{pz} = \frac{g \times T_{pz} + h \times T_{qz'}}{g + h}$$

Wherein, x is the serial number of the transitional region to which the pixel to be calculated belongs, p is the serial number of the sub-region to which the pixel to be calculated belongs, z is the serial number of the pixel to be calculated in the p-th sub-region, m is the serial number of the transitional region longitudinally adjacent to the x-th transitional region and closest to the p-th sub-region, q is the serial number of the sub-region adjacent to the p-th sub-region longitudinally and located in the m-th transitional region, z' is the serial number of a pixel located in the same column as the pixel to be calculated in the q-th sub-region, $L_x$ is the transitional mapping restriction parameter of the x-th transitional region, x' is the serial number of the transitional region horizontally adjacent to the x-th transitional region and closest to the p-th sub-region, $L_x'$ is the transitional mapping restriction parameter of the x'-th transitional region, $L_m$ is the transitional mapping restriction parameter of the m-th transitional region, m' is the serial number of the transitional region horizontally adjacent to the m-th transitional region and closest to the q-th sub-region, $L_m'$ is the transitional mapping restriction parameter of the m'-th transitional region, c is the distance between the pixel to be calculated and the longitudinal median of the x'-th transitional region, d is the distance between the pixel to be calculated and the longitudinal median of the transitional region to which it belongs, c' is the distance between the z'-th pixel in the q-th sub-region and the longitudinal median of the m'-th transitional region, d' is the distance between the z'-th pixel in the q-th sub-region and the longitudinal median of the transitional region to which it belongs, g is the distance between the pixel to be calculated and the horizontal median of the m-th transitional region, h is the distance between the pixel to be calculated and the horizontal median of the transitional region to which it belongs, $T_{pz}$ is a middle mapping restriction parameter of the pixel to be calculated, $T_{qz'}$ is a middle mapping restriction parameter of the z'-th pixel in the q-th sub-region, and $W_{pz}$ is a mapping restriction parameter of the pixel to be calculated.

In an embodiment, the step of adjusting a grayscale value of each pixel in the grayscale image according to the determined equilibrium mapping curve of the whole grayscale image and the mapping restriction parameter for each pixel in each of the sub-regions further comprises the step of:

adjusting a grayscale value of each pixel in the grayscale image by the following formula:

$$i'_y = \frac{\lambda_y \times S_y + i_y}{\lambda_y + 1}$$

Wherein, y is the serial number of a pixel, $i_y$ is the original grayscale value of the y-th pixel in the grayscale image, $i_y'$ is the adjusted grayscale value of the y-th pixel in the grayscale image, $\lambda_y$ is a mapping restriction parameter of the y-th pixel, and $S_y$ is a mapping value of the y-th pixel.

According to another aspect, there is provided an image processing device, comprising an equilibrium mapping curve determiner configured to determine an equilibrium mapping curve of a whole grayscale image according to the grayscale image in a YUV mode image; a mapping restriction parameter determiner configured to divide the whole grayscale image into a plurality of sub-regions, and determine a mapping restriction parameter for each pixel in each of the sub-regions; and a grayscale adjustor configured to adjust a grayscale value of each pixel in the grayscale image according to the determined equilibrium mapping curve of the whole grayscale image and the mapping restriction parameter for each pixel in each of the sub-regions.

In an embodiment, the image processing device further comprises a first image converter configured to convert an obtained image to be processed into a grayscale chrominance YUV mode image; and a second image converter configured to convert the adjusted grayscale image into an image of original mode.

In an embodiment, the equilibrium mapping curve determiner is further configured to determine a pixel depth and a grayscale histogram of the grayscale image in the YUV mode image, and the grayscale value of each pixel in the grayscale image; and calculate the equilibrium mapping curve of the whole grayscale image by the following formula:

$$S_k = D \times \sum_{i=0}^{k} \frac{H(i)}{SUM}, 0 \le k \le D$$

Wherein, k is the grayscale value of a pixel in the grayscale image, $S_k$ is the mapping value of a pixel with a grayscale value of k in the grayscale image, SUM is the total number of the pixels in the grayscale image, H(i) is the number of the pixels with a grayscale value of i in the grayscale image, and D is the pixel depth of the grayscale image.

In an embodiment, the mapping restriction parameter determiner is further configured to divide the whole grayscale image into a plurality of transitional regions, and determine a transitional mapping restriction parameter of each of the transitional regions; and divide each of the transitional regions into a plurality of sub-regions, and determine a mapping restriction parameter for each pixel in each of the sub-regions according to the determined transitional mapping restriction parameter of each of the transitional regions and a set linear interpolation calculation rule.

In an embodiment, the mapping restriction parameter determiner is further configured to determine a grayscale mean value and a grayscale standard deviation of each of the transitional regions; and calculate the transitional mapping restriction parameter of each of the transitional regions by the following formula:

$$L_{1x} = [M_x \times N_{min1} + (T_1 - M_x) \times N_{max1}]/D$$

$$L_{2x} = [S_x \times N_{min2} + (T_2 - S_x) \times N_{max2}]/D$$

$$L_x = \sqrt{L_{1x} \times L_{2x}}$$

Wherein, x is the serial number of a transitional region, $M_x$ is the grayscale mean value of the x-th transitional region, $S_x$ is the grayscale standard deviation of the x-th transitional region, $N_{min1}$ and $N_{max1}$ are respectively the preset minimum limit value and maximum limit value corresponding to the grayscale mean value of each of the transitional regions, $N_{min2}$ and $N_{max2}$ are respectively the preset minimum limit value and maximum limit value corresponding to the grayscale standard deviation of each of the transitional regions, $T_1$ is a preset limit threshold corresponding to the grayscale mean value of each of the transitional regions, $T_2$ is a preset limit threshold corresponding to the grayscale standard deviation of each of the transitional regions, D is the pixel depth of the grayscale image, $L_{1x}$ is a transitional mapping restriction parameter corresponding to the grayscale mean value $M_x$ of the x-th transitional region, $L_{2x}$ is a transitional mapping restriction parameter corresponding to the grayscale standard deviation $S_x$ of the x-th transitional region, and $L_x$ is the transitional mapping restriction parameter of the x-th transitional region.

In an embodiment, the mapping restriction parameter determiner is further configured to determine a category of each of the sub-regions according to the position of each of the sub-regions in the grayscale image, the category comprising: sub-regions located in four corners of the grayscale image, sub-regions located on the borders, except the four corners, of the grayscale image, and sub-regions located in other space, except on the borders, of the grayscale image; determine a mapping restriction parameter of each pixel in the sub-regions located in the four corners of the grayscale image as the transitional mapping restriction parameter of the transitional region it belongs to according to the determined transitional mapping restriction parameter of each of the transitional regions; determine a mapping restriction parameter of each pixel in the sub-regions located on the borders, except the four corners, of the grayscale image according to the determined transitional mapping restriction parameter of each of the transitional regions and according to a preset uni-linear interpolation calculation rule; and determine a mapping restriction parameter of each pixel in the sub-regions located in other space, except on the borders, of the grayscale image according to the determined transitional mapping restriction parameter of each of the transitional regions and according to a preset bi-linear interpolation calculation rule.

In an embodiment, the mapping restriction parameter determiner is further configured to calculate a mapping restriction parameter of each pixel in the sub-regions located on the borders, except the four corners, of the grayscale image by the following formula:

$$\lambda_{tr} = \frac{a \times L_n + b \times L'_n}{a + b}$$

Wherein, n is the serial number of the transitional region to which the pixel to be calculated belongs, t is the serial number of the sub-region to which the pixel to be calculated belongs, r is the serial number of the pixel to be calculated in the t-th sub-region, $L_n$ is the transitional mapping restriction parameter of the n-th transitional region, n' is the serial number of the transitional region located on the borders of the grayscale image and closest to the t-th sub-region, Ln' is the transitional mapping restriction parameter of the n'-th transitional region, a is the distance between the pixel to be calculated and the median of the n'-th transitional region, b is the distance between the pixel to be calculated and the median of the transitional region to which it belongs, and $\lambda_{tr}$ is the mapping restriction parameter of the pixel to be calculated.

In an embodiment, the mapping restriction parameter determiner is further configured to calculate a mapping restriction parameter of each pixel in the sub-regions located in other space, except on the borders, of the grayscale image by the following formula:

$$T_{pz} = \frac{c \times L_x + d \times L'_x}{c + d}$$

$$T_{qz'} = \frac{c' \times L_m + d' \times L'_m}{c' + d'}$$

$$W_{pz} = \frac{g \times T_{pz} + h \times T_{qz'}}{g + h}$$

Wherein, x is the serial number of the transitional region to which the pixel to be calculated belongs, p is the serial number of the sub-region to which the pixel to be calculated belongs, z is the serial number of the pixel to be calculated in the p-th sub-region, m is the serial number of the transitional region longitudinally adjacent to the x-th transitional region and closest to the p-th sub-region, q is the serial number of the sub-region adjacent to the p-th sub-region longitudinally and located in the m-th transitional region, z' is the serial number of a pixel located in the same column as the pixel to be calculated in the q-th sub-region, $L_x$ is the transitional mapping restriction parameter of the x-th transitional region, x' is the serial number of the transitional region horizontally adjacent to the x-th transitional region and closest to the p-th sub-region, $L_x'$ is the transitional mapping restriction parameter of the x'-th transitional region, $L_m$ is the transitional mapping restriction parameter of the m-th transitional region, m' is the serial number of the transitional region horizontally adjacent to the m-th transitional region and closest to the q-th sub-region, $L_{m'}$ is the transitional mapping restriction parameter of the m'-th transitional region, c is the distance between the pixel to be calculated and the longitudinal median of the x'-th transitional region, d is the distance between the pixel to be calculated and the longitudinal median of the transitional region to which it belongs, c' is the distance between the z'-th pixel in the q-th sub-region and the longitudinal median of the m'-th transitional region, d' is the distance between the z'-th pixel in the q-th sub-region and the longitudinal median of the transitional region to which it belongs, g is the distance between the pixel to be calculated and the horizontal median of the m-th transitional region, h is the distance between the pixel to be calculated and the horizontal median of the transitional region to which it belongs, $T_{pz}$ is a middle mapping restriction parameter of the pixel to be calculated, $T_{qz'}$ is a middle mapping restriction parameter of the z'-th pixel in the q-th sub-region, and $W_{pz}$ is a mapping restriction parameter of the pixel to be calculated.

In an embodiment, the grayscale adjustor is further configured to adjust a grayscale value of each pixel in the grayscale image by the following formula:

$$i'_y = \frac{\lambda_y \times S_y + i_y}{\lambda_y + 1}$$

Wherein, y is the serial number of a pixel, $i_y$ is the grayscale value of the y-th pixel in the grayscale image, $i_y'$ is the adjusted grayscale value of the y-th pixel in the grayscale image, $\lambda_y$ is a mapping restriction parameter of the y-th pixel, and $S_y$ is a mapping value of the y-th pixel.

According to another aspect, there is provided a computer readable storage medium, which stores computer readable instructions that cause a computer to perform any method as stated above when executed by a computer.

According to another aspect, there is provided a computing device comprising a memory configured to store computer executable instructions; and a processor configured to execute the computer executable instructions so as to perform any method as stated above.

Some embodiments of the present disclosure can realize at least one of the following advantageous effects and/or other advantageous effects:

some embodiments provided by the present disclosure can first convert an obtained image to be processed into a grayscale chrominance YUV mode image; determine an equilibrium mapping curve of a whole grayscale image according to the grayscale image in a YUV mode image; divide the whole grayscale image into a plurality of sub-regions, and determine a mapping restriction parameter for each pixel in each of the sub-regions; adjust a grayscale value of each pixel in the grayscale image according to the determined equilibrium mapping curve of the whole grayscale image and the mapping restriction parameter for each pixel in each of the sub-regions; and convert the adjusted grayscale image into an image of original mode. When an image is processed in conjunction with a global histogram equalization algorithm and a local histogram equalization algorithm, the details of the image can be better presented after the grayscale of the grayscale image is adjusted using an equilibrium mapping curve and a plurality of mapping restriction parameters. Meanwhile, since the method uses an equilibrium mapping curve and a plurality of mapping restriction parameters, it greatly reduces the calculation amount as compared with the conventional local histogram equalization algorithm, and the image of the display is effectively enhanced at a high speed with less resource consumption and the image details remain.

BRIEF DESCRIPTION OF DRAWINGS

To explain some embodiments of the present disclosure more clearly, the present disclosure provides the following drawings used for describing the embodiments. It should be realized that the following drawings are only related to some embodiments. Those skilled in the art can obtain other drawings according to these drawings without making inventive effort, and the other drawings also fall within the scope of the present invention.

DETAILED DESCRIPTION

To understand the objects, technical solutions and advantages of some embodiments more clearly, the embodiments will be described in detail with reference to the drawings and implementations. It needs to be explained that the embodiments described herein are merely a part, not the whole, of the embodiments of the present invention. On the basis of the embodiments in the present disclosure, other embodiments can be obtained by those ordinarily skilled in the art without making inventive labour, and all the obtained other embodiments fall within the scope of the present invention.

Figure 1:
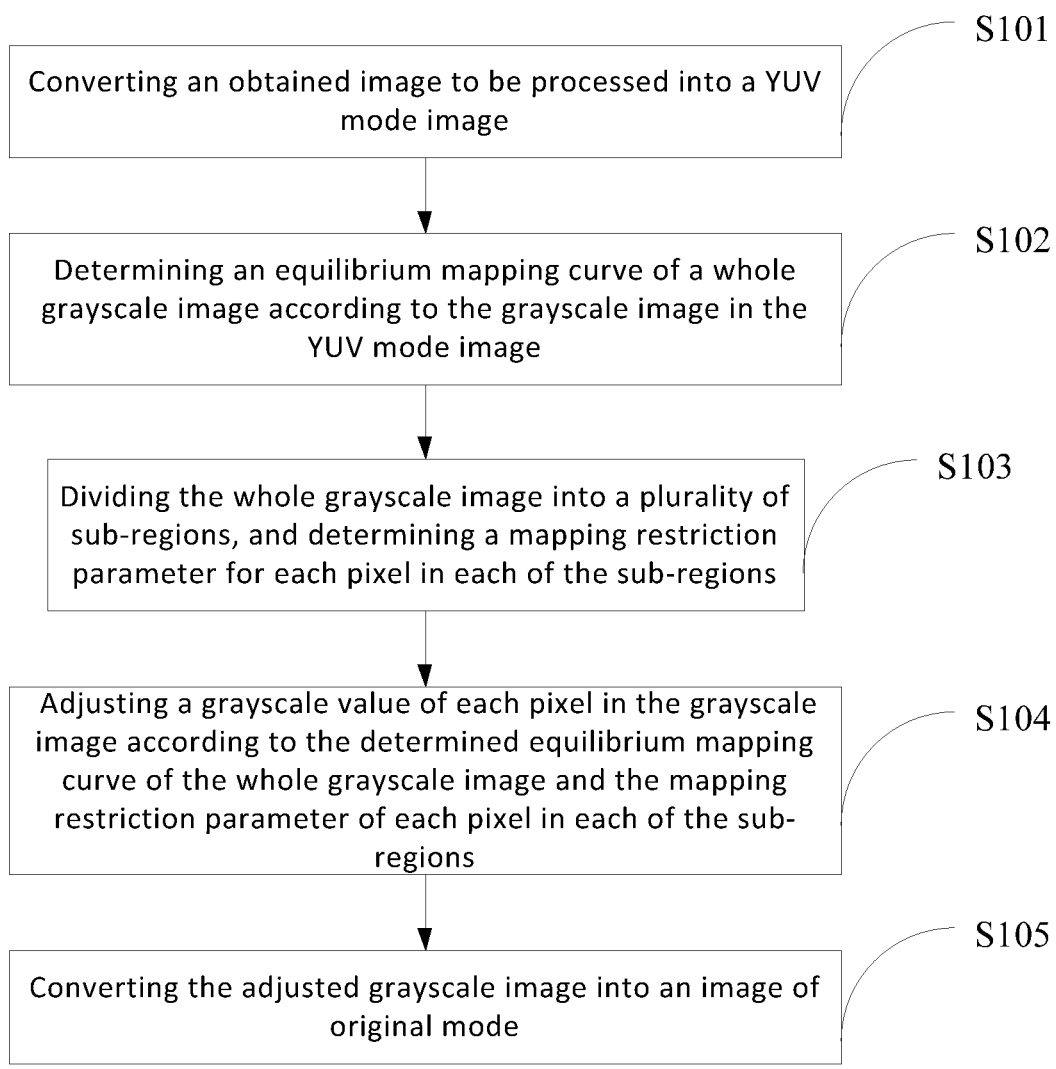
FIG. 1 is a flowchart of an image processing method according to an embodiment of the present invention.

There is provided an image processing method according to an embodiment of the present invention. As shown in FIG. 1, the image processing method can comprise the steps of:

S101: converting an obtained image to be processed into a YUV mode image;

S102: determining an equilibrium mapping curve of a whole grayscale image according to the grayscale image in the YUV mode image;

S103: dividing the whole grayscale image into a plurality of sub-regions, and determining a mapping restriction parameter for each pixel in each of the sub-regions;

S104: adjusting a grayscale value of each pixel in the grayscale image according to the determined equilibrium mapping curve of the whole grayscale image and the mapping restriction parameter of each pixel in each of the sub-regions; and S105: converting the adjusted grayscale image into an image of original mode.

It shall be pointed out that if the obtained image to be processed itself is a YUV mode image, it is unnecessary to execute the image converting step, and the steps S101 and S105 can be omitted from the image processing method. Additionally, it shall be pointed out that in the step S103, the whole grayscale image can be divided according to a preset rule, which will be described hereinafter.

In the image processing method according to an embodiment of the present invention, when an image is processed in conjunction with a global histogram equalization algorithm and a local histogram equalization algorithm, the details of the image can be better presented after the grayscale of the grayscale image is adjusted using an equilibrium mapping curve and a plurality of mapping restriction parameters. Meanwhile, since the method uses an equilibrium mapping curve and a plurality of mapping restriction parameters, it greatly reduces the calculation amount as compared with the conventional local histogram equalization algorithm, and the image of the display is effectively enhanced at a high speed with less resource consumption and the image details remain.

In an implementation, the YUV mode image refers to a grayscale chrominance image, wherein "Y" indicates the grayscale of an image, and "U" and "V" both indicate the chrominance of an image for describing colour and saturation of an image. In an embodiment, when the obtained image to be processed is converted into a YUV mode image, the image to be processed may be either an RGB mode image or other mode image, which will not be limited. However, despite of the mode of the image to be processed, the image when being processed is first converted into the YUV mode image.

In order to obtain the equilibrium mapping curve of the whole grayscale image, the step S102 of the image processing method determines the equilibrium mapping curve of the whole grayscale image according to the grayscale image in the YUV mode image. In an embodiment, the step S102 can further specifically comprise the steps of:

determining a pixel depth and a grayscale histogram of the grayscale image in the YUV mode image, and the pixel value or grayscale value of each pixel in the grayscale image; and calculating the equilibrium mapping curve of the whole grayscale image by the following formula:

$$S_k = D \times \sum_{i=0}^{k} \frac{H(i)}{SUM}, 0 \le k \le D$$

Wherein, k is the grayscale value of each pixel in the grayscale image, $S_k$ is the mapping value of a pixel with a grayscale value of k in the grayscale image, SUM is the total number of the pixels in the grayscale image, H(i) is a grayscale histogram of the grayscale image in the YUV mode image, to be specific, H(i) is the number of the pixels with a grayscale value of i in the grayscale image, and D is the pixel depth of the grayscale image. i is an internal index in a summation formula for indexing the grayscale value of the pixel in the grayscale image.

To be specific, the image processing method mainly processes the grayscale image, so it is first required to obtain the grayscale image in the YUV image before processing the YUV image. By scanning the obtained grayscale image it is possible to obtain a series of parameters of the grayscale image, comprising a pixel depth of the grayscale image and a grayscale histogram statistical result, and the pixel value or grayscale value of each pixel in the grayscale image, as well as the total number of the pixels in the grayscale image, thereby determining the equilibrium mapping curve of the whole grayscale image.

Furthermore, in the process of calculating the equilibrium mapping curve of the whole grayscale image, it is required to obtain the pixel depth of the grayscale image, and the pixel depth is related to the number of gray levels. For instance, when the grayscale image has 256 gray levels, the pixel depth of the grayscale image is 255; and when the grayscale image has 1024 gray levels, the pixel depth of the grayscale image is 1023. Hence, the pixel depth shall be selected according to the number of gray levels of the grayscale image, which is not limited herein.

In order to obtain the mapping restriction parameter of each pixel in each of the sub-regions, the step S103 of the image processing method divides the whole grayscale image into a plurality of sub-regions, and determines a mapping restriction parameter of each pixel in each of the sub-regions. In an embodiment, the step S103 can further specifically comprise the steps of:

dividing the whole grayscale image into a plurality of transitional regions, and determining a transitional mapping restriction parameter of each of the transitional regions; and dividing each of the transitional regions into a plurality of sub-regions, and determining a mapping restriction parameter of each pixel in each of the sub-regions according to the determined transitional mapping restriction parameter of each of the transitional regions and a set linear interpolation calculation rule.

Figure 2A:
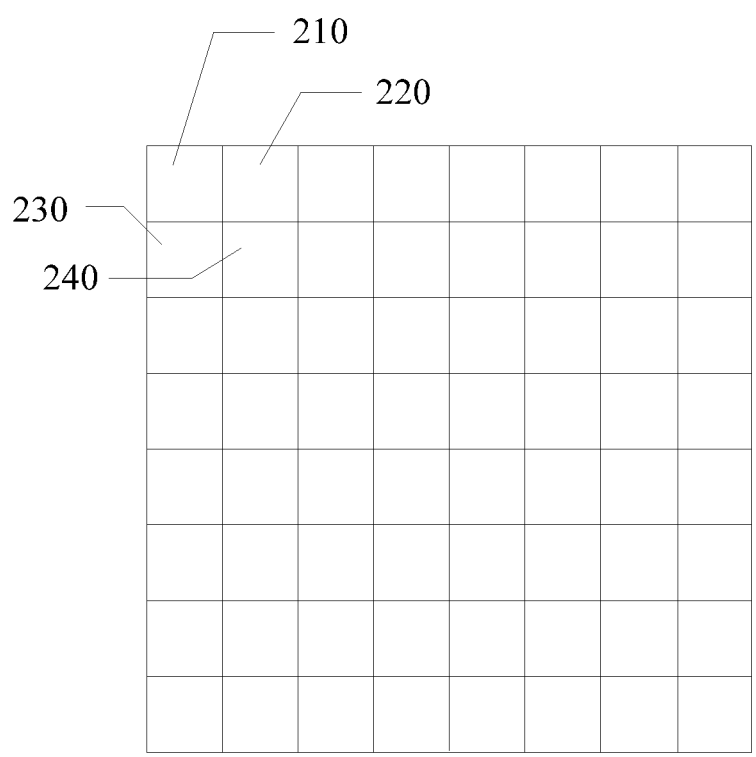
FIGS. 2a to 2c are schematic views showing the division of a grayscale image according to some embodiments of the present invention.

In an implementation, the whole grayscale image can be divided into a plurality of sub-regions according to the preset rule. In an implementation, the whole grayscale image can be divided into a plurality of transitional regions according to the preset rule or each of the transitional regions can be divided into a plurality of sub-regions according to the preset rule. The preset rule to be followed can be dividing equally or unequally. For instance, as shown in FIG. 2a, the whole grayscale image is equally divided into 64 transitional regions. Taking the transitional regions 210, 220, 230 and 240 for example, the four transitional regions have equal size.

In an embodiment, the step of determining a transitional mapping restriction parameter of each of the transitional regions in the image processing method can further specifically comprise the steps of:

determining a grayscale mean value and a grayscale standard deviation of each of the transitional regions; and calculating the transitional mapping restriction parameter of each of the transitional regions by the following formula:

$$L_{1x} = [M_x \times N_{min1} + (T_1 - M_x) \times N_{max1}]/D$$

$$L_{2x} = [S_x \times N_{min2} + (T_2 - S_x) \times N_{max2}]/D$$

$$L_x = \sqrt{L_{1x} \times L_{2x}}$$

Wherein, x is the serial number of the transitional region of which the transitional mapping restriction parameter needs to be calculated, $M_x$ is the grayscale mean value of the x-th transitional region, $S_x$ is the grayscale standard deviation of the x-th transitional region, $N_{min1}$ and $N_{max1}$ are respectively the preset minimum limit value and maximum limit value corresponding to the grayscale mean value of each of the transitional regions, $N_{min2}$ and $N_{max2}$ are respectively the preset minimum limit value and maximum limit value corresponding to the grayscale standard deviation of each of the transitional regions, $T_1$ is a preset limit threshold corresponding to the grayscale mean value of each of the transitional regions, $T_2$ is a preset limit threshold corresponding to the grayscale standard deviation of each of the transitional regions, D is the pixel depth of the grayscale image, $L_{1x}$ is the transitional mapping restriction parameter corresponding to the grayscale mean value $M_x$ of the x-th transitional region, $L_{2x}$ is the transitional mapping restriction parameter corresponding to the grayscale standard deviation $S_x$ of the x-th transitional region, and $L_x$ is the transitional mapping restriction parameter of the x-th transitional region.

Any method for obtaining a grayscale mean value and a grayscale standard deviation in the prior art can be used to determine the grayscale mean value and the grayscale standard deviation of each of the transitional regions, as long as the grayscale mean value and the grayscale standard deviation can be obtained, which will not be limited herein. There are multiple calculating and determining manners in the prior art, which will not be reiterated herein.

In an embodiment, in the calculation of the transitional mapping restriction parameter of each of the transitional regions, the minimum limit value $N_{min1}$ and the maximum limit value $N_{max1}$ corresponding to the grayscale mean value of each of the transitional regions, and the minimum limit value $N_{min2}$ and the maximum limit value $N_{max2}$ corresponding to the grayscale standard deviation of each of the transitional regions may be respectively empirical values preset according to the image confusion. The values may be an integer or a non-integer. The minimum limit value $N_{min1}$ corresponding to the grayscale mean value of each of the transitional regions can be equal or unequal to the minimum limit value $N_{min2}$ corresponding to the grayscale standard deviation of each of the transitional regions. The maximum limit value $N_{max1}$ corresponding to the grayscale mean value of each of the transitional regions can be equal or unequal to the maximum limit value $N_{max2}$ corresponding to the grayscale standard deviation of each of the transitional regions. Moreover, a limit threshold $T_1$ corresponding to the grayscale mean value of each of the transitional regions and a limit threshold $T_2$ corresponding to the grayscale standard deviation of each of the transitional regions can also be preset empirical values. For instance, when the grayscale mean value $M_x$ is greater than its corresponding limit threshold $T_1$ or the grayscale deviation standard $S_x$ is greater than its corresponding limit threshold $T_2$, it is determined that the grayscale mean value $M_x$ is the corresponding limit threshold $T_1$ or the grayscale deviation standard $S_x$ is the corresponding limit threshold $T_2$; and when the grayscale mean value $M_x$ is less than or equal to its corresponding limit threshold $T_1$ or the grayscale deviation standard $S_x$ is less than or equal to its corresponding limit threshold $T_2$, it is determined that the grayscale mean value $M_x$ or the grayscale deviation standard $S_x$ is its own value. Furthermore, the limit threshold $T_1$ corresponding to the grayscale mean value of each of the transitional regions can be equal or unequal to the limit threshold $T_2$ corresponding to the grayscale standard deviation of each of the transitional regions. Therefore, the values of the above six parameters can be determined according to a specific grayscale image, which will not be limited herein.

In order to determine a mapping restriction parameter for each pixel in each of the sub-regions and eliminate the blocking effect between transitional regions, in the image processing method according to an embodiment of the present invention, a mapping restriction parameter for each pixel in each of the sub-regions can be determined according to the determined transitional mapping restriction parameter of each of the transitional regions and a set linear interpolation calculation rule, wherein the step of determining a mapping restriction parameter for each pixel in each of the sub-regions can further specifically comprise the steps of:

determining a category of each of the sub-regions according to the position of each of the sub-regions in the grayscale image, the category comprising: sub-regions located in four corners of the grayscale image, sub-regions located on the borders, except the four corners, of the grayscale image, and sub-regions located in other space, except on the borders, of the grayscale image;

determining a mapping restriction parameter for each pixel in the sub-regions located in the four corners of the grayscale image as the transitional mapping restriction parameter of the transitional region it belongs to according to the determined transitional mapping restriction parameter of each of the transitional regions;

determining a mapping restriction parameter for each pixel in the sub-regions located on the borders, except the four corners, of the grayscale image according to the determined transitional mapping restriction parameter of each of the transitional regions and according to a preset uni-linear interpolation calculation rule; and determining a mapping restriction parameter for each pixel in the sub-regions located in other space, except on the borders, of the grayscale image according to the determined transitional mapping restriction parameter of each of the transitional regions and according to a preset bi-linear interpolation calculation rule.

Figure 2B:
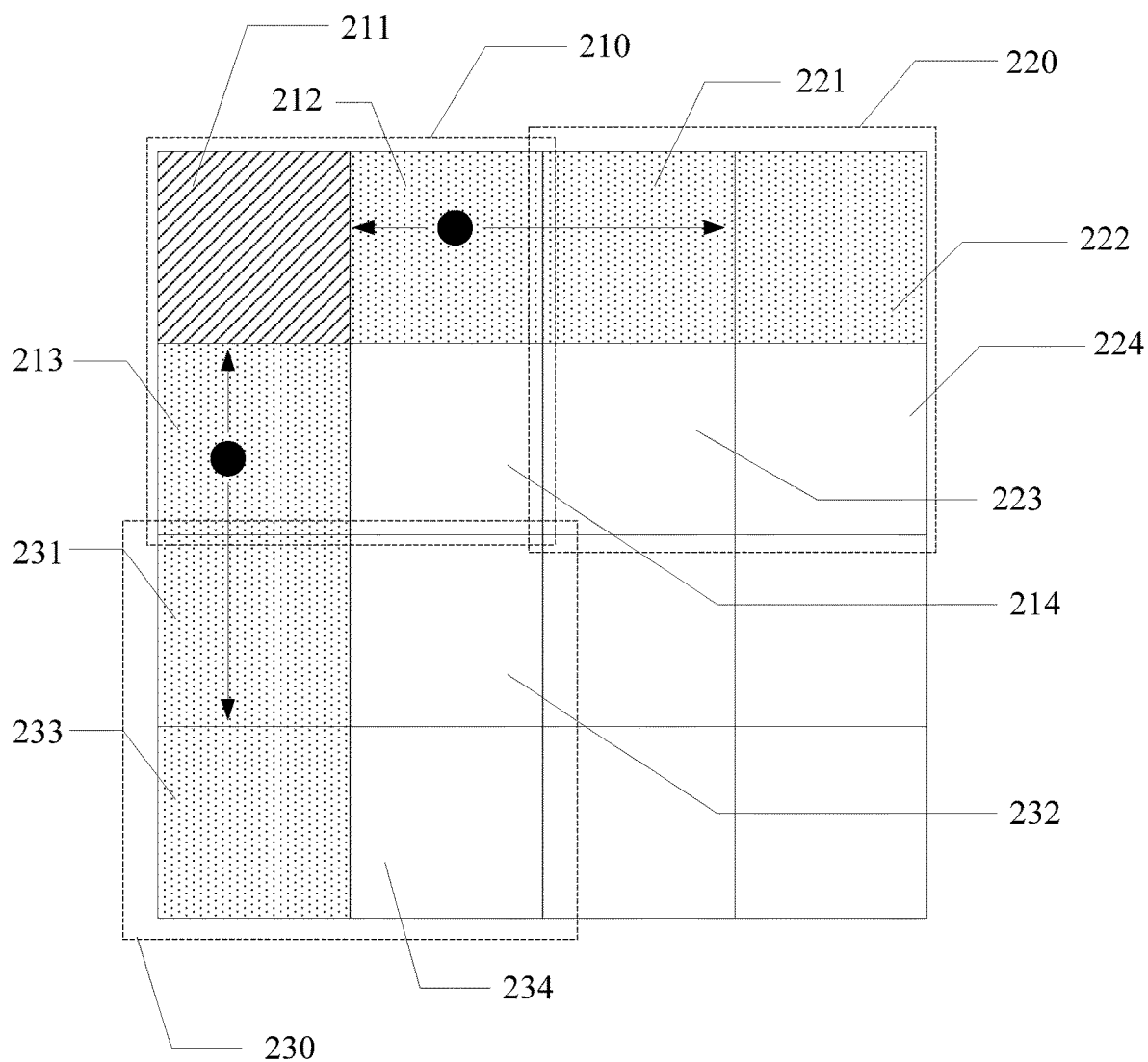

FIG. 2b is a partial enlarged view of FIG. 2a. As shown in FIG. 2b, sub-regions 211, 212, 213, 214 constitute a sub-region 210; sub-regions 221, 222, 223, 224 constitute a sub-region 220; and sub-regions 231, 232, 233, 234 constitute a sub-region 230. The sub-region 211 is located in the corner of the grayscale image, so the mapping restriction parameter for each pixel in the sub-region 211 is the transitional mapping restriction parameter of the transitional region 210 to which the sub-region 211 belongs. The sub-regions 212 and 213 are located in the borders, except the four corners, of the grayscale image, so the mapping restriction parameter for each pixel in the sub-regions 212 and 213 can be determined according to the preset uni-linear interpolation calculation rule. The sub-region 214 is located in other space, except on the borders, of the grayscale image, so the mapping restriction parameter for each pixel in the sub-region 214 can be determined according to the preset bi-linear interpolation calculation rule.

In order to obtain a mapping restriction parameter for each pixel in the sub-regions located on the borders, except the four corners, of the grayscale image, in the image processing method according to an embodiment of the present invention, a mapping restriction parameter for each pixel in the sub-regions located on the borders, except the four corners, of the grayscale image can be determined according to the determined transitional mapping restriction parameter of each of the transitional regions and according to a preset uni-linear interpolation calculation rule. In an embodiment, the step of determining a mapping restriction parameter for each pixel in the sub-regions located on the borders, except the four corners, of the grayscale image further comprises the step of:

calculating a mapping restriction parameter for each pixel in the sub-regions located on the borders, except the four corners, of the grayscale image by the following formula:

$$\lambda_{tr} = \frac{a \times L_n + b \times L'_n}{a + b}$$

Wherein, n is the serial number of the transitional region to which the pixel to be calculated belongs, and the transitional region is located on the borders of the grayscale image, t is the serial number of the sub-region to which the pixel to be calculated belongs, and the sub-region is located in the n-th transitional region and on the borders, except the four corners, of the grayscale image, r is the serial number of the pixel to be calculated in the t-th sub-region, so the pixel to be calculated is the r-th pixel in the t-th sub-region, $L_n$ is the transitional mapping restriction parameter of the n-th transitional region, n' is the serial number of the transitional region adjacent to the n-th transitional-region and located on the borders of the grayscale region, and the transitional region is the one located on the borders of the grayscale region and closest to the t-th sub-region, Ln' is the transitional mapping restriction parameter of the n'-th transitional region, a is the distance between the pixel to be calculated and the median of the n'-th transitional region, b is the distance between the pixel to be calculated and the median of the transitional region to which it belongs, and $\lambda_{tr}$ is the mapping restriction parameter of the pixel to be calculated.

The linear interpolation calculation comprises horizontal interpolation calculation and longitudinal interpolation calculation. In the horizontal interpolation calculation, a is the distance between the r-th pixel in the t-th sub-region and the longitudinal median of the transitional region horizontally adjacent to the t-th sub-region, and b is the distance between the r-th pixel in the t-th sub-region and the longitudinal median of the transitional region to which it belongs; and in the longitudinal interpolation calculation, a is the distance between the r-th pixel in the t-th sub-region and the horizontal median of the transitional region longitudinally adjacent to the t-th sub-region, and b is the distance between the r-th pixel in the t-th sub-region and the horizontal median of the transitional region to which it belongs For instance, in FIG. 2b, take for example the determination of a mapping restriction parameter $\lambda_{212r}$ of the r-th pixel in the sub-region 212 located on the borders, except the four corners, of the grayscale image, the horizontal interpolation calculation is required. According to the interpolation calculation formula: $\lambda_{212r} = (a \times L_{210} + b \times L_{220})/(a+b)$, $L_{210}$ is the transitional mapping restriction parameter of the transitional region 210, $L_{220}$ is the transitional mapping restriction parameter of the transitional region 220, a is the distance between the r-th pixel in the sub-region 212 and the longitudinal median of the transitional region 220, b is the distance between the r-th pixel in the sub-region 212 and the longitudinal median of the transitional region 210, and $\lambda_{212r}$ is the mapping restriction parameter of the r-th pixel in the sub-region 212.

Longitudinal interpolation calculation is required for determining a mapping restriction parameter of the r'-th pixel in the sub-region 213. According to the interpolation calculation formula: $\lambda_{213r'} = (a' \times L_{210} + b' \times L_{230})/(a'+b')$, $L_{210}$ is a transitional mapping restriction parameter of the transitional region 210, $L_{230}$ is a transitional mapping restriction parameter of the transitional region 230, a is the distance between the r'-th pixel in the sub-region 213 and the horizontal median of the transitional region 230, b is the distance between the r'-th pixel in the sub-region 213 and the horizontal median of the transitional region 210, and $\lambda_{213r'}$ is a mapping restriction parameter of the r'-th pixel in the sub-region 213.

In order to obtain a mapping restriction parameter for each pixel in the sub-regions located in other space, except on the borders, of the grayscale image, in the image processing method according to an embodiment of the present invention, a mapping restriction parameter for each pixel in the sub-regions located in other space, except on the borders, of the grayscale image can be determined according to the determined transitional mapping restriction parameter of each of the transitional regions and according to a preset bi-linear interpolation calculation rule. In an embodiment, the step of determining a mapping restriction parameter for each pixel in the sub-regions located in other space, except on the borders, of the grayscale image can further specifically comprise the step of:

calculating a mapping restriction parameter for each pixel in the sub-regions located in other space, except on the borders, of the grayscale image by the following formula:

$$T_{pz} = \frac{c \times L_x + d \times L'_x}{c + d}$$

$$T_{qz'} = \frac{c' \times L_m + d' \times L'_m}{c' + d'}$$

$$W_{pz} = \frac{g \times T_{pz} + h \times T_{qz'}}{g+h}$$

Wherein, x is the serial number of the transitional region to which the pixel to be calculated belongs, p is the serial number of the sub-region to which the pixel to be calculated belongs, and the sub-region is located in the x-th transitional region and in a non-border position in the grayscale image, z is the serial number of the pixel to be calculated in the p-th sub-region, that is to say, the pixel to be calculated is the z-th pixel in the p-th sub-region, m is the serial number of the transitional region longitudinally adjacent to the x-th transitional region and closest to the p-th sub-region, q is the serial number of the sub-region adjacent to the p-th sub-region longitudinally and located in the m-th transitional region, z' is the serial number of a pixel located in the same column as the pixel to be calculated in the q-th sub-region, $L_x$ is the transitional mapping restriction parameter of the x-th transitional region, x' is the serial number of the transitional region horizontally adjacent to the x-th transitional region and closest to the p-th sub-region, $L_x'$ is the transitional mapping restriction parameter of the x'-th transitional region, $L_m$ is the transitional mapping restriction parameter of the m-th transitional region, m' is the serial number of the transitional region horizontally adjacent to the m-th transitional region and closest to the q-th sub-region, $L_m'$ is the transitional mapping restriction parameter of the m'-th transitional region, c is the distance between the pixel to be calculated and the longitudinal median of the x'-th transitional region, d is the distance between the pixel to be calculated and the longitudinal median of the transitional region to which it belongs, c' is the distance between the z'-th pixel in the q-th sub-region and the longitudinal median of the m'-th transitional region, d' is the distance between the z'-th pixel in the q-th sub-region and the longitudinal median of the transitional region to which it belongs, g is the distance between the pixel to be calculated and the horizontal median of the m-th transitional region, h is the distance between the pixel to be calculated and the horizontal median of the transitional region to which it belongs, $T_{pz}$ is a middle mapping restriction parameter of the pixel to be calculated, $T_{qz'}$ is a middle mapping restriction parameter of the z'-th pixel in the q-th sub-region, and $W_{pz}$ is a mapping restriction parameter of the pixel to be calculated. It shall be pointed out that z', in a strict sense, only represents a projection of the z pixel in an adjacent sub-region, but not a real pixel, and is only characterized by being in the same column as z, so c and c' are actually equal, so do d and d'. Hence, the middle mapping restriction parameter $T_{qz'}$ of the z'-th pixel in the q-th sub-region is only a median value, and cannot be used as an actual mapping restriction parameter of an actual parameter.

In an embodiment, two interpolation calculations are required for determining a mapping restriction parameter for each pixel in the sub-regions located in other space, except on the borders, of the grayscale image according to a preset bi-linear interpolation calculation rule, wherein the first interpolation calculation is horizontal interpolation calculation, and after two middle mapping restriction parameters are obtained, the second interpolation calculation is done using the two middle mapping restriction parameters, and the second interpolation calculation is longitudinal interpolation calculation.

Figure 2C:
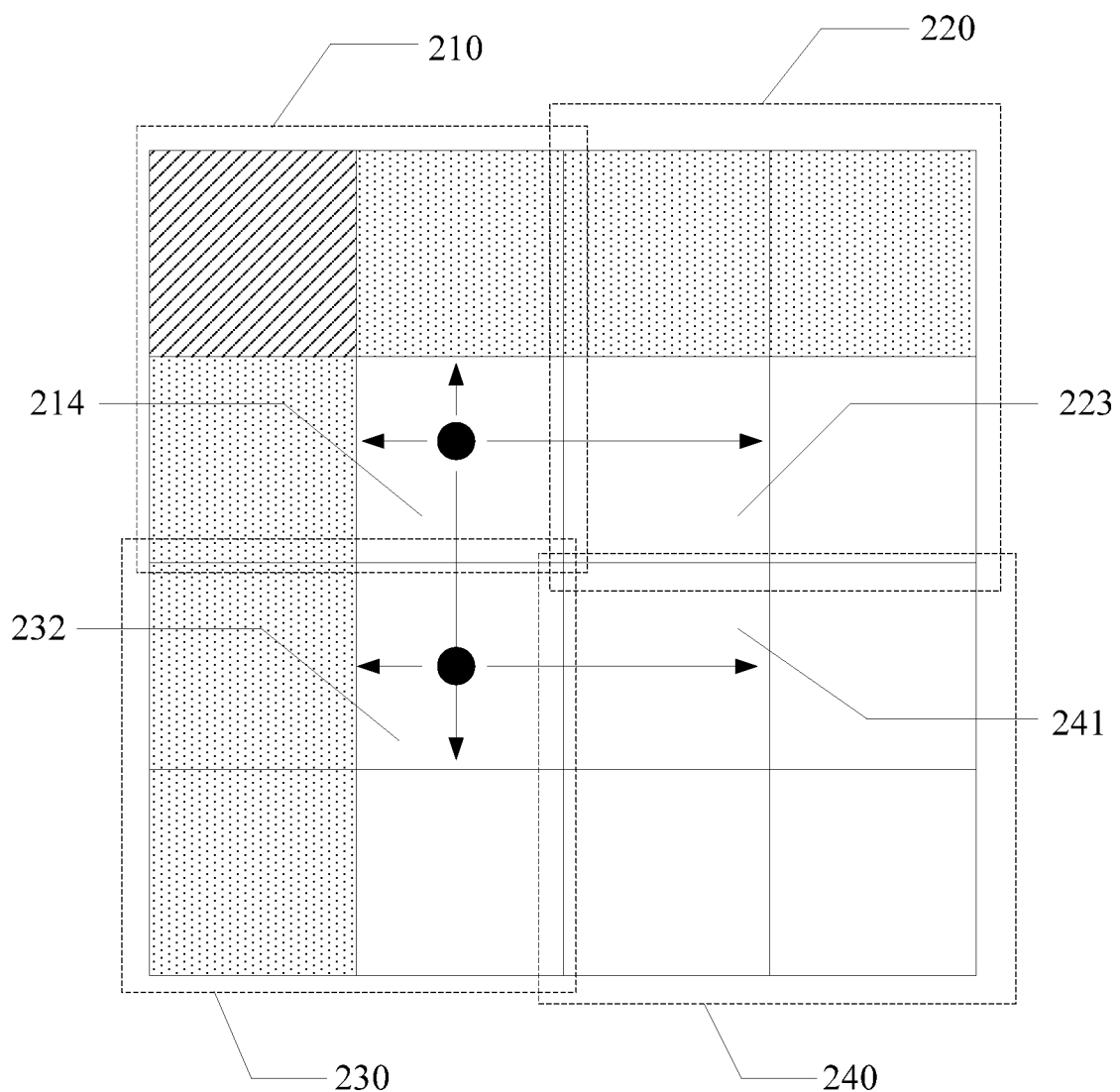

FIG. 2c is a partial enlarged view of FIG. 2a. For instance, as shown in FIG. 2c, the sub-region 214 belongs to the transitional region 210, the sub-region 223 belongs to the transitional region 220, the sub-region 232 belongs to the transitional region 230, and the sub-region 241 belongs to the transitional region 240. The bi-linear interpolation calculation rule as stated above will be explained by taking the calculation of the mapping restriction parameter of the z-th pixel in the sub-region 214 for example. First, do the horizontal interpolation calculation. According to the interpolation formulae: $T_{214z} = (c \times L_{210} + d \times L_{220})/(c+d)$ and $T_{232z'} = (c' \times L_{230} + d' \times L_{240})/(c'+d')$, $L_{210}$ is a transitional mapping restriction parameter of the transitional region 210, $L_{220}$ is a transitional mapping restriction parameter of the transitional region 220, $L_{230}$ is a transitional mapping restriction parameter of the transitional region 230, $L_{240}$ is a transitional mapping restriction parameter of the transitional region 240, c is the distance between the z-th pixel in the sub-region 214 and the longitudinal median of the transitional region 220, d is the distance between the z-th pixel in the sub-region 214 and the longitudinal median of the transitional region 210, c' is the distance between the z'-th pixel located in the sub-region 232 and in the same column as the z-th pixel and the longitudinal median of the transitional region 240, d' is the distance between the z'-th pixel located in the sub-region 232 and in the same column as the z-th pixel and the longitudinal median of the transitional region 230. The middle mapping restriction parameter $T_{214z}$ of the z-th pixel in the sub-region 214 and the middle mapping restriction parameter $T_{232z'}$ of the z'-th pixel in the sub-region 232 can be obtained by the above formulae.

Then, according to the middle mapping restriction parameter $T_{214z}$ of the z-th pixel in the sub-region 214 and the middle mapping restriction parameter $T_{232z'}$ of the z'-th pixel in the sub-region 232, do the longitudinal interpolation calculation. According to the interpolation formula: $W_{214z} = (g \times T_{214z} + h \times T_{232z'})/(g+h)$, g is the distance between the z-th pixel in the sub-region 214 and the horizontal median of the transitional region 230, h is the distance between the z-th pixel in the sub-region 214 and the horizontal median of the transitional region 210, and finally the mapping restriction parameter $W_{214z}$ of the z-th pixel in the sub-region 214 can be obtained. Of course, $\lambda_{214z}$ can also be used to represent the mapping restriction parameter of the z-th pixel in the sub-region 214, and $W_{214z}$ and $\lambda_{214z}$ have the same meaning, indicative of the mapping restriction parameter of the z-th pixel in the sub-region 214.

As stated above, in order to adjust a grayscale value of each pixel in the grayscale image, the step S104 in the image processing method according to an embodiment of the present invention can adjust a grayscale value of each pixel in the grayscale image according to the determined equilibrium mapping curve of the whole grayscale image and the mapping restriction parameter for each pixel in each of the sub-regions. In an embodiment, the step S104 can further specifically comprise the step of:

adjusting a grayscale value of each pixel in the grayscale image by the following formula:

$$i_y' = \frac{\lambda_y \times S_y + i_y}{\lambda_y + 1}$$

Wherein, y is the serial number of a pixel, $i_y$ is the original grayscale value of the y-th pixel in the grayscale image, $i_y'$ is the adjusted grayscale value of the y-th pixel in the grayscale image, $\lambda_y$ is a mapping restriction parameter of the y-th pixel, and $S_y$ is a mapping value of the y-th pixel.

It can be known according to the above calculation that the grayscale value $i_y'$ of the y-th pixel in the adjusted grayscale image is between the original grayscale value $i_y$ of the y-th pixel and the mapping value $S_y$ of the grayscale image. When the mapping restriction parameter $\lambda_y$ of the y-th pixel gets bigger, the adjusted grayscale value $i_y'$ of the y-th pixel becomes closer to the mapping value $S_y$ of the y-th pixel in the grayscale image.

The image processing method according to an embodiment of the present invention will be explained in detail in conjunction with an embodiment.

Figure 3:
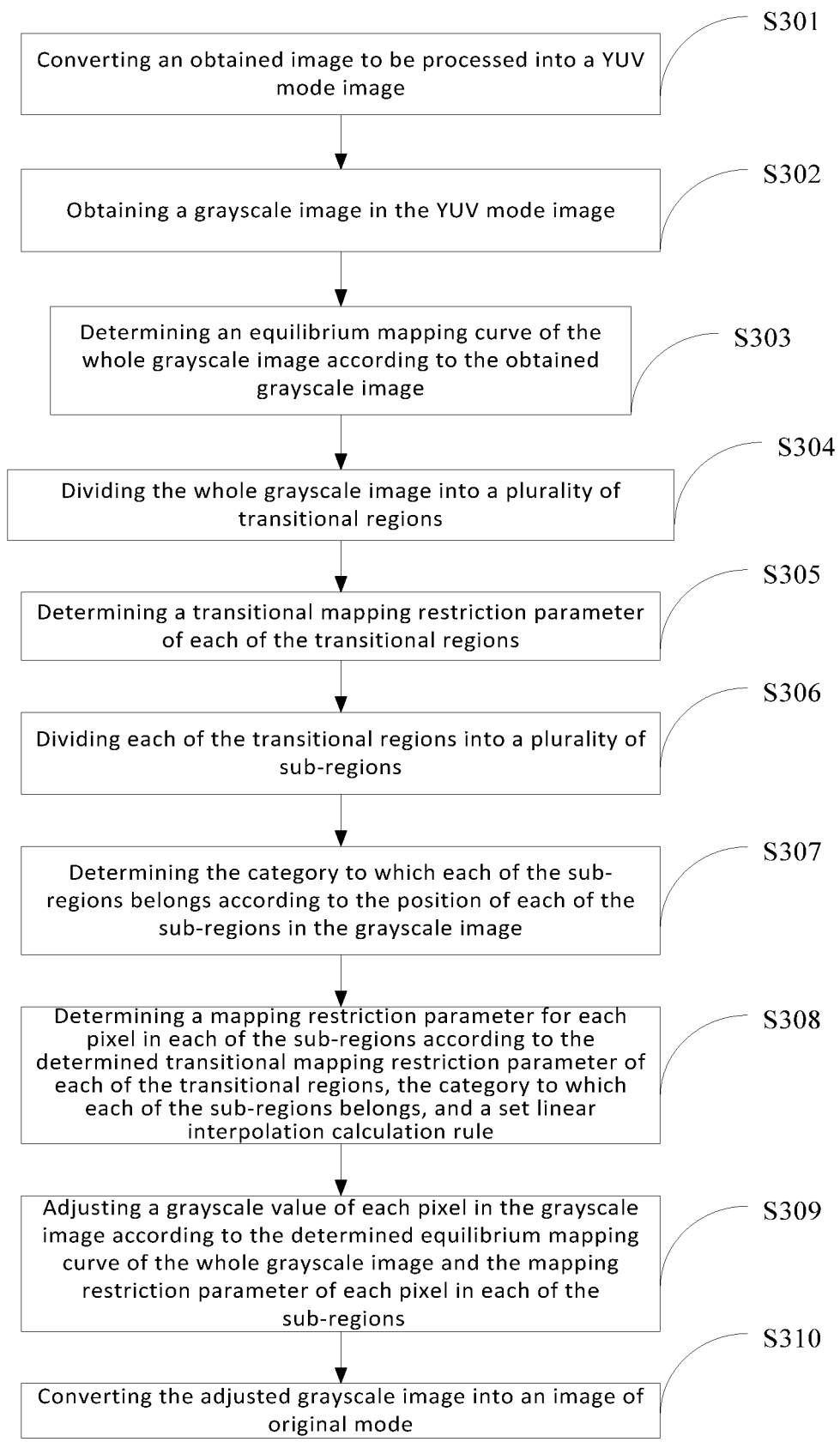
FIG. 3 is a flowchart of an image processing method according to an embodiment of the present invention.

FIG. 3 is a flowchart of an image processing method according to an embodiment of the present invention. As shown in FIG. 3, the image processing method comprises the following method steps S301 to S310:

S301: converting an obtained image to be processed into a YUV mode image;

S302: obtaining a grayscale image in the YUV mode image;

S303: determining an equilibrium mapping curve of a whole grayscale image according to the obtained grayscale image;

S304: dividing the whole grayscale image into a plurality of transitional regions;

S305: determining a transitional mapping restriction parameter of each of the transitional regions;

S306: dividing each of the transitional regions into a plurality of sub-regions;

S307: determining the category to which each of the sub-regions belongs according to the position of each of the sub-regions in the grayscale image;

S308: determining a mapping restriction parameter for each pixel in each of the sub-regions according to the determined transitional mapping restriction parameter of each of the transitional regions, the category to which each of the sub-regions belongs, and a set linear interpolation calculation rule;

S309: adjusting a grayscale value of a pixel in the grayscale image according to the determined equilibrium mapping curve of the whole grayscale image and the mapping restriction parameter of each pixel in each of the sub-regions; and S310: converting the adjusted grayscale image into an image of original mode.

As pointed out previously, if the obtained image to be processed itself is a YUV mode image, it is unnecessary to execute the image converting step, and the steps S301 and S310 can be omitted from the image processing method. It shall also be pointed out that the whole grayscale image can be divided into a plurality of transitional regions according to a preset rule, or each of the transitional regions can be divided into a plurality of sub-regions according to a preset rule, which has been stated previously.

According to another aspect of the present invention, there is also provided an image processing device. Since the problem-solving principle of the device is similar to that of the image processing method as stated above, reference can be made to the implementation of the method for the implementation of the device, which will not be reiterated herein.

Figure 4:
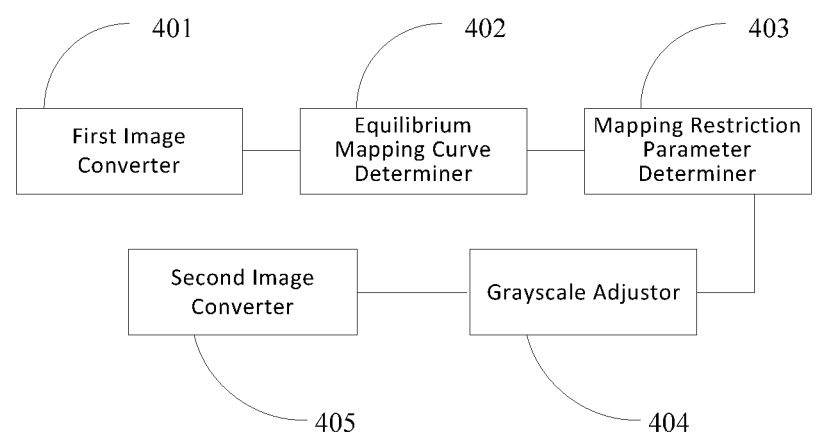
FIG. 4 is a structural schematic view of an image processing device according to an embodiment of the present invention.

FIG. 4 is a structural schematic view of an image processing device according to an embodiment of the present invention. As shown in FIG. 4, the image processing device can comprise:

a first image converter 401 configured to convert an obtained image to be processed into a grayscale chrominance YUV mode image;

an equilibrium mapping curve determiner 402 configured to determine an equilibrium mapping curve of a whole grayscale image according to the grayscale image in the YUV mode image;

a mapping restriction parameter determiner 403 configured to divide the whole grayscale image into a plurality of sub-regions, and determine a mapping restriction parameter for each pixel in each of the sub-regions;

a grayscale adjustor 404 configured to adjust a grayscale value of each pixel in the grayscale image according to the determined equilibrium mapping curve of the whole grayscale image and the mapping restriction parameter of each pixel in each of the sub-regions; and a second image converter 405 configured to convert the adjusted grayscale image into an image of original mode.

As pointed out previously, if the obtained image to be processed itself is a YUV mode image, it is unnecessary to execute the image conversion, and the first image converter 401 and the second image converter 405 can be omitted from the image processing device. As stated above, the mapping restriction parameter determiner 403 can also be configured to divide the whole grayscale image into a plurality of sub-regions according to a preset rule.

In an embodiment, the equilibrium mapping curve determiner 402 in the image processing device can be further configured to determine a pixel depth and a grayscale histogram of the grayscale image in the YUV mode image, and the pixel value or grayscale value of each pixel in the grayscale image; and calculate the equilibrium mapping curve of the whole grayscale image by the following formula:

$$S_k = D \times \sum_{i=0}^{k} \frac{H(i)}{\text{SUM}}, 0 \le k \le D$$

Wherein, k is the grayscale value of each pixel in the grayscale image, $S_k$ is the mapping value of a pixel with a grayscale value of k in the grayscale image, SUM is the total number of the pixels in the grayscale image, H(i) is the number of the pixels with a grayscale value of i in the grayscale image, and D is the pixel depth of the grayscale image.

In an embodiment, the mapping restriction parameter determiner 403 in the image processing device can be further configured to divide the whole grayscale image into a plurality of transitional regions, and determine a transitional mapping restriction parameter of each of the transitional regions; and divide each of the transitional regions into a plurality of sub-regions, and determine a mapping restriction parameter for each pixel in each of the sub-regions according to the determined transitional mapping restriction parameter of each of the transitional regions and a set linear interpolation calculation rule. As stated above, the mapping restriction parameter determiner 403 can also be configured to divide the whole grayscale image and each of the transitional regions according to a preset rule.

In an embodiment, the mapping restriction parameter determiner 403 in the image processing device can be further configured to determine a grayscale mean value and a grayscale standard deviation of each of the transitional regions; and calculate the transitional mapping restriction parameter of each of the transitional regions by the following formula:

$$L_{1x}=[M_x \times N_{min1}+(T_1-M_x) \times N_{max1}]/D$$

$$L_{2x}=[S_x \times N_{min2}+(T_2-S_x) \times N_{max2}]/D$$

$$L_x=\sqrt{L_{1x} \times L_{2x}}$$

Wherein, x is the serial number of a transitional region, $M_x$ is the grayscale mean value of the x-th transitional region, $S_x$ is the grayscale standard deviation of the x-th transitional region, $N_{min1}$ and $N_{max1}$ are respectively the preset minimum limit value and maximum limit value corresponding to the grayscale mean value of each of the transitional regions, $N_{min2}$ and $N_{max2}$ are respectively the preset minimum limit value and maximum limit value corresponding to the grayscale standard deviation of each of the transitional regions, $T_1$ is a preset limit threshold corresponding to the grayscale mean value of each of the transitional regions, $T_2$ is a preset limit threshold corresponding to the grayscale standard deviation of each of the transitional regions, D is the pixel depth of the grayscale image, $L_{1x}$ is the transitional mapping restriction parameter corresponding to the grayscale mean value $M_x$ of the x-th transitional region, $L_{2x}$ is the transitional mapping restriction parameter corresponding to the grayscale standard deviation $S_x$ of the x-th transitional region, and $L_x$ is the transitional mapping restriction parameter of the x-th transitional region.

In an embodiment, the mapping restriction parameter determiner 403 in the image processing device can be further configured to determine a category of each of the sub-regions according to the position of each of the sub-regions in the grayscale image, the category comprising: sub-regions located in four corners of the grayscale image, sub-regions located on the borders, except the four corners, of the grayscale image, and sub-regions located in other space, except on the borders, of the grayscale image; determine a mapping restriction parameter for each pixel in the sub-regions located in the four corners of the grayscale image as the transitional mapping restriction parameter of the transitional region it belongs to according to the determined transitional mapping restriction parameter of each of the transitional regions; determine a mapping restriction parameter for each pixel in the sub-regions located on the borders, except the four corners, of the grayscale image according to the determined transitional mapping restriction parameter of each of the transitional regions and according to a preset uni-linear interpolation calculation rule; and determine a mapping restriction parameter for each pixel in the sub-regions located in other space, except on the borders, of the grayscale image according to the determined transitional mapping restriction parameter of each of the transitional regions and according to a preset bi-linear interpolation calculation rule.

In an embodiment, the mapping restriction parameter determiner 403 in the image processing device can be further configured to calculate a mapping restriction parameter for each pixel in the sub-regions located on the borders, except the four corners, of the grayscale image by the following formula:

$$\lambda_{tr} = \frac{a \times L_n + b \times L'_n}{a+b}$$

Wherein, n is the serial number of the transitional region to which the pixel to be calculated belongs, t is the serial number of the sub-region to which the pixel to be calculated belongs, r is the serial number of the pixel to be calculated in the t-th sub-region, $L_n$ is the transitional mapping restriction parameter of the n-th transitional region, n' is the serial number of the transitional region located on the borders of the grayscale region and closest to the t-th sub-region, Ln' is the transitional mapping restriction parameter of the n'-th transitional region, a is the distance between the pixel to be calculated and the median of the n'-th transitional region, b is the distance between the pixel to be calculated and the median of the transitional region to which it belongs, and $\lambda_{tr}$ is the mapping restriction parameter of the pixel to be calculated.

In an embodiment, the mapping restriction parameter determiner 403 in the image processing device can be further configured to calculate a mapping restriction parameter for each pixel in the sub-regions located in other space, except on the borders, of the grayscale image by the following formula:

$$T_{pz} = \frac{c \times L_x + d \times L'_x}{c+d}$$

$$T_{qz'} = \frac{c' \times L_m + d' \times L'_m}{c'+d'}$$

$$W_{pz} = \frac{g \times T_{pz} + h \times T_{qz'}}{g+h}$$

Wherein, x is the serial number of the transitional region to which the pixel to be calculated belongs, p is the serial number of the sub-region to which the pixel to be calculated belongs, z is the serial number of the pixel to be calculated in the p-th sub-region, m is the serial number of the transitional region longitudinally adjacent to the x-th transitional region and closest to the p-th sub-region, q is the serial number of the sub-region adjacent to the p-th sub-region longitudinally and located in the m-th transitional region, z' is the serial number of a pixel located in the same column as the pixel to be calculated in the q-th sub-region, $L_x$ is the transitional mapping restriction parameter of the x-th transitional region, x' is the serial number of the transitional region horizontally adjacent to the x-th transitional region and closest to the p-th sub-region, $L_x$' is the transitional mapping restriction parameter of the x'-th transitional region, $L_m$ is the transitional mapping restriction parameter of the m-th transitional region, m' is the serial number of the transitional region horizontally adjacent to the m-th transitional region and closest to the q-th sub-region, $L_m$' is the transitional mapping restriction parameter of the m'-th transitional region, c is the distance between the pixel to be calculated and the longitudinal median of the x'-th transitional region, d is the distance between the pixel to be calculated and the longitudinal median of the transitional region to which it belongs, c' is the distance between the z'-th pixel in the q-th sub-region and the longitudinal median of the m'-th transitional region, d' is the distance between the z'-th pixel in the q-th sub-region and the longitudinal median of the transitional region to which it belongs, g is the distance between the pixel to be calculated and the horizontal median of the m-th transitional region, h is the distance between the pixel to be calculated and the horizontal median of the transitional region to which it belongs, $T_{pz}$ is a middle mapping restriction parameter of the pixel to be calculated, $T_{qz'}$ is a middle mapping restriction parameter of the z'-th pixel in the q-th sub-region, and $W_{pz}$ is a mapping restriction parameter of the pixel to be calculated.

In an embodiment, the grayscale adjustor 404 in the image processing device can be further configured to adjust a grayscale value of each pixel in the grayscale image by the following formula:

$$i'_y = \frac{\lambda_y \times S_y + i_y}{\lambda_y + 1}$$

Wherein, y is the serial number of a pixel, $i_y$ is the grayscale value of the y-th pixel in the grayscale image, $i_y'$ is the adjusted grayscale value of the y-th pixel in the grayscale image, is a mapping restriction parameter of the y-th pixel, and $S_y$ is a mapping value of the y-th pixel.

According to another aspect, there is provided a computer readable storage medium, which stores computer readable instructions that cause a computer to perform any method according to the present disclosure when executed by a computer.

According to another aspect, there is provided a computing device. The computing device comprises a memory configured to store computer executable instructions; and a processor configured to execute the computer executable instructions so as to perform any method according to the present disclosure.

Some embodiments provided by the present disclosure can first convert an obtained image to be processed into a grayscale chrominance YUV mode image; determine an equilibrium mapping curve of a whole grayscale image according to the grayscale image in a YUV mode image; divide the whole grayscale image into a plurality of sub-regions, and determine a mapping restriction parameter for each pixel in each of the sub-regions; adjust a grayscale value of each pixel in the grayscale image according to the determined equilibrium mapping curve of the whole grayscale image and the mapping restriction parameter of each pixel in each of the sub-regions; and convert the adjusted grayscale image into an image of original mode. When an image is processed in conjunction with a global histogram equalization algorithm and a local histogram equalization algorithm, the details of the image can be better presented after the grayscale of the grayscale image is adjusted using an equilibrium mapping curve and a plurality of mapping restriction parameters. Meanwhile, since the method uses an equilibrium mapping curve and a plurality of mapping restriction parameters, it greatly reduces the calculation amount as compared with the conventional local histogram equalization algorithm, and the image of the display is effectively enhanced at a high speed with less resource consumption and the image details remain.

It can be understood that the above depictions are merely exemplary embodiments of the present invention, but the protection scope of the present invention is not limited thereto. It shall be noted that without departing from the spirit and principle of the present invention, those ordinarily skilled in the art can conceive of various modifications and variations, which shall fall within the protection scope of the present invention. Thus, the protection scope of the present invention shall be based on the protection scope of the appended claims.

What needs to be explained is that the above embodiments are only illustrated by way of the individual function modules division. In actual application, the above functions can be allocated to different functional modules as desired. The internal structure of the device can be divided into different functional modules so as to accomplish all or part of the functions as stated above. In addition, function(s) of the above one module can be achieved by a plurality of modules, and functions of the plurality of modules can be integrated into one module.

In the claims, any reference sign in parentheses should not be interpreted as a limitation to the claims. The terms "comprise/include" do not exclude the presence of elements or steps other than those listed in the claims. The word "a" or "an" in front of elements does not exclude the presence of a plurality of such elements. The present invention can be realized by hardware comprising several separate elements, or suitably programmed software or firmware, or by any combination thereof.

In an apparatus or system claim enumerating several devices, one or more devices can be embodied in the same hardware project. The fact that only some measures are recited in mutually different dependent claims does not mean that the combination of those measures cannot be utilized advantageously.

What is claimed is:

1. An image processing method, comprising the steps of:
determining an equilibrium mapping curve of a whole grayscale image according to the grayscale image in a YUV mode image;
dividing the whole grayscale image into a plurality of sub-regions, and determining a mapping restriction parameter for each pixel in each of the sub-regions; and
adjusting a grayscale value of each pixel in the grayscale image according to the determined equilibrium mapping curve of the whole grayscale image and the mapping restriction parameter of each pixel in each of the sub-regions.

2. The image processing method according to claim 1, further comprising the steps of:
converting an image to be processed into a grayscale chrominance YUV mode image; and
converting the adjusted grayscale image into an image of original mode.

3. The image processing method according to claim 1, wherein the step of determining an equilibrium mapping curve of a whole grayscale image according to a grayscale image in a YUV mode image further comprises the steps of:
determining a pixel depth and a grayscale histogram of the grayscale image in the YUV mode image, and the grayscale value of each pixel in the grayscale image; and
calculating the equilibrium mapping curve of the whole grayscale image by the following formula:

$$S_k = D \times \sum_{i=0}^{k} \frac{H(i)}{SUM}, 0 \le k \le D$$

wherein, k is the grayscale value of a pixel in the grayscale image, $S_k$ is the mapping value of a pixel with a grayscale value of k in the grayscale image, SUM is the total number of the pixels in the grayscale image, H(i) is the number of the pixels with a grayscale value of i in the grayscale image, and D is the pixel depth of the grayscale image.

4. The image processing method according to claim 3, wherein the step of dividing the whole grayscale image into a plurality of sub-regions, and determining a mapping restriction parameter for each pixel in each of the sub-regions further comprises the steps of:

dividing the whole grayscale image into a plurality of transitional regions, and determining a transitional mapping restriction parameter of each of the transitional regions; and dividing each of the transitional regions into a plurality of sub-regions, and determining a mapping restriction parameter for each pixel in each of the sub-regions according to the determined transitional mapping restriction parameter of each of the transitional regions and a set linear interpolation calculation rule.

5. The image processing method according to claim 4, wherein the step of determining a transitional mapping restriction parameter of each of the transitional regions further comprises the steps of:

determining a grayscale mean value and a grayscale standard deviation of each of the transitional regions; and calculating the transitional mapping restriction parameter of each of the transitional regions by the following formula:

$$L_{1x}=[M_x \times N_{min1}+(T_1-M_x) \times N_{max1}]/D$$

$$L_{2x}=[S_x \times N_{min2}+(T_2-S_x) \times N_{max2}]/D$$

$$L_x=\sqrt{L_{1x} \times L_{2x}}$$

wherein, x is the serial number of a transitional region, $M_x$ is the grayscale mean value of the x-th transitional region, $S_x$ is the grayscale standard deviation of the x-th transitional region, $N_{min1}$ and $N_{max1}$ are respectively the preset minimum limit value and maximum limit value corresponding to the grayscale mean value of each of the transitional regions, $N_{min2}$ and $N_{max2}$ are respectively the preset minimum limit value and maximum limit value corresponding to the grayscale standard deviation of each of the transitional regions, $T_1$ is a preset limit threshold corresponding to the grayscale mean value of each of the transitional regions, $T_2$ is a preset limit threshold corresponding to the grayscale standard deviation of each of the transitional regions, D is the pixel depth of the grayscale image, $L_{1x}$ is a transitional mapping restriction parameter corresponding to the grayscale mean value $M_x$ of the x-th transitional region, $L_{2x}$ is a transitional mapping restriction parameter corresponding to the grayscale standard deviation $S_x$ of the x-th transitional region, and $L_x$ is the transitional mapping restriction parameter of the x-th transitional region.

6. The image processing method according to claim 4, wherein the step of determining a mapping restriction parameter for each pixel in each of the sub-regions according to the determined transitional mapping restriction parameter of each of the transitional regions and a set linear interpolation calculation rule further comprises the steps of:

determining a category of each of the sub-regions according to the position of each of the sub-regions in the grayscale image, the category comprising: sub-regions located in four corners of the grayscale image, sub-regions located on the borders, except the four corners, of the grayscale image, and sub-regions located in other space, except on the borders, of the grayscale image;

determining a mapping restriction parameter for each pixel in the sub-regions located in the four corners of the grayscale image as the transitional mapping restriction parameter of the transitional region it belongs to according to the determined transitional mapping restriction parameter of each of the transitional regions;

determining a mapping restriction parameter for each pixel in the sub-regions located on the borders, except the four corners, of the grayscale image according to the determined transitional mapping restriction parameter of each of the transitional regions and according to a preset uni-linear interpolation calculation rule; and determining a mapping restriction parameter for each pixel in the sub-regions located in other space, except on the borders, of the grayscale image according to the determined transitional mapping restriction parameter of each of the transitional regions and according to a preset bi-linear interpolation calculation rule.

7. The image processing method according to claim 6, wherein the step of determining a mapping restriction parameter for each pixel in the sub-regions located on the borders, except the four corners, of the grayscale image according to the determined transitional mapping restriction parameter of each of the transitional regions and according to a preset uni-linear interpolation calculation rule further comprises the step of:

calculating a mapping restriction parameter for each pixel in the sub-regions located on the borders, except the four corners, of the grayscale image by the following formula:

$$\lambda_{tr} = \frac{a \times L_n + b \times L'_n}{a+b}$$

wherein, n is the serial number of the transitional region to which the pixel to be calculated belongs, t is the serial number of the sub-region to which the pixel to be calculated belongs, r is the serial number of the pixel to be calculated in the t-th sub-region, $L_n$ is the transitional mapping restriction parameter of the n-th transitional region, n' is the serial number of the transitional region located on the borders of the grayscale image and closest to the t-th sub-region, Ln' is the transitional mapping restriction parameter of the n'-th transitional region, a is the distance between the pixel to be calculated and the median of the n'-th transitional region, b is the distance between the pixel to be calculated and the median of the transitional region to which it belongs, and $\lambda_{tr}$ is the mapping restriction parameter of the pixel to be calculated.

8. The image processing method according to claim 6, wherein the step of determining a mapping restriction parameter for each pixel in the sub-regions located in other space, except on the borders, of the grayscale image according to the determined transitional mapping restriction parameter of each of the transitional regions and according to a preset bi-linear interpolation calculation rule further comprises the step of:

calculating a mapping restriction parameter for each pixel in the sub-regions located in other space, except on the borders, of the grayscale image by the following formula:

$$T_{pz} = \frac{c \times L_x + d \times L'_x}{c+d}$$

$$T_{qz'} = \frac{c' \times L_m + d' \times L'_m}{c'+d'}$$

-continued $$W_{pz} = \frac{g \times T_{pz} + h \times T_{qz'}}{g + h}$$

Wherein, x is the serial number of the transitional region to which the pixel to be calculated belongs, p is the serial number of the sub-region to which the pixel to be calculated belongs, z is the serial number of the pixel to be calculated in the p-th sub-region, m is the serial number of the transitional region longitudinally adjacent to the x-th transitional region and closest to the p-th sub-region, q is the serial number of the sub-region adjacent to the p-th sub-region longitudinally and located in the m-th transitional region, z' is the serial number of a pixel located in the same column as the pixel to be calculated in the q-th sub-region, $L_x$ is the transitional mapping restriction parameter of the x-th transitional region, x' is the serial number of the transitional region horizontally adjacent to the x-th transitional region and closest to the p-th sub-region, $L_x'$ is the transitional mapping restriction parameter of the x'-th transitional region, $L_m$ is the transitional mapping restriction parameter of the m-th transitional region, m' is the serial number of the transitional region horizontally adjacent to the m-th transitional region and closest to the q-th sub-region, $L_m'$ is the transitional mapping restriction parameter of the m'-th transitional region, c is the distance between the pixel to be calculated and the longitudinal median of the x'-th transitional region, d is the distance between the pixel to be calculated and the longitudinal median of the transitional region to which it belongs, c' is the distance between the z'-th pixel in the q-th sub-region and the longitudinal median of the m'-th transitional region, d' is the distance between the z'-th pixel in the q-th sub-region and the longitudinal median of the transitional region to which it belongs, g is the distance between the pixel to be calculated and the horizontal median of the m-th transitional region, h is the distance between the pixel to be calculated and the horizontal median of the transitional region to which it belongs, $T_{pz}$ is a middle mapping restriction parameter of the pixel to be calculated, $T_{qz'}$ is a middle mapping restriction parameter of the z'-th pixel in the q-th sub-region, and $W_{pz}$ is a mapping restriction parameter of the pixel to be calculated.

9. The image processing method according to claim 6, wherein the step of adjusting a grayscale value of each pixel in the grayscale image according to the determined equilibrium mapping curve of the whole grayscale image and the mapping restriction parameter of each pixel in each of the sub-regions further comprises the step of:

adjusting a grayscale value of each pixel in the grayscale image by the following formula:

$$i_y' = \frac{\lambda_y \times S_y + i_y}{\lambda_y + 1}$$

wherein, y is the serial number of each pixel, $i_y$ is the original grayscale value of the y-th pixel in the grayscale image, $i_y'$ is the adjusted grayscale value of the y-th pixel in the grayscale image, $\lambda_y$ is a mapping restriction parameter of the y-th pixel, and $S_y$ is a mapping value of the y-th pixel.

10. An image processing device, comprising:
an equilibrium mapping curve determiner configured to determine an equilibrium mapping curve of a whole grayscale image according to the grayscale image in a YUV mode image;
a mapping restriction parameter determiner configured to divide the whole grayscale image into a plurality of sub-regions, and determine a mapping restriction parameter for each pixel in each of the sub-regions; and
a grayscale adjustor configured to adjust a grayscale value of each pixel in the grayscale image according to the determined equilibrium mapping curve of the whole grayscale image and the mapping restriction parameter of each pixel in each of the sub-regions.

11. The image processing device according to claim 10, further comprising:
a first image converter configured to convert an obtained image to be processed into a grayscale chrominance YUV mode image; and
a second image converter configured to convert the adjusted grayscale image into an image of original mode.

12. The image processing device according to claim 10, wherein the equilibrium mapping curve determiner is further configured to determine a pixel depth and a grayscale histogram of the grayscale image in the YUV mode image, and the grayscale value of each pixel in the grayscale image; and calculate the equilibrium mapping curve of the whole grayscale image by the following formula:

$$S_k = D \times \sum_{i=0}^{k} \frac{H(i)}{\text{SUM}}, 0 \leq k \leq D$$

wherein, k is the grayscale value of each pixel in the grayscale image, $S_k$ is the mapping value of a pixel with a grayscale value of k in the grayscale image, SUM is the total number of the pixels in the grayscale image, H(i) is the number of the pixels with a grayscale value of i in the grayscale image, and D is the pixel depth of the grayscale image.

13. The image processing device according to claim 12, wherein the mapping restriction parameter determiner is further configured to divide the whole grayscale image into a plurality of transitional regions, and determine a transitional mapping restriction parameter of each of the transitional regions; and divide each of the transitional regions into a plurality of sub-regions, and determine a mapping restriction parameter for each pixel in each of the sub-regions according to the determined transitional mapping restriction parameter of each of the transitional regions and a set linear interpolation calculation rule.

14. The image processing device according to claim 13, wherein the mapping restriction parameter determiner is further configured to determine a grayscale mean value and a grayscale standard deviation of each of the transitional regions; and calculate the transitional mapping restriction parameter of each of the transitional regions by the following formula:

$$L_{1x} = [M_x \times N_{min1} + (T_1 - M_x) \times N_{max1}]/D$$

$$L_{2x} = [S_x \times N_{min2} + (T_2 - S_x) \times N_{max2}]/D$$

$$L_x = \sqrt{L_{1x} \times L_{2x}}$$

Wherein, x is the serial number of a transitional region, $M_x$ is the grayscale mean value of the x-th transitional region, $S_x$ is the grayscale standard deviation of the x-th transitional region, $N_{min1}$ and $N_{max1}$ are respectively the preset minimum limit value and maximum limit value corresponding to the grayscale mean value of each of the transitional regions, $N_{min2}$ and $N_{max2}$ are respectively the preset minimum limit value and maximum limit value corresponding to the grayscale standard deviation of each of the transitional regions, $T_1$ is a preset limit threshold corresponding to the grayscale mean value of each of the transitional regions, $T_2$ is a preset limit threshold corresponding to the grayscale standard deviation of each of the transitional regions, D is the pixel depth of the grayscale image, $L_{1x}$ is a transitional mapping restriction parameter corresponding to the grayscale mean value $M_x$ of the x-th transitional region, $L_{2x}$ is a transitional mapping restriction parameter corresponding to the grayscale standard deviation $S_x$ of the x-th transitional region, and $L_x$ is the transitional mapping restriction parameter of the x-th transitional region.

15. The image processing device according to claim 13, wherein the mapping restriction parameter determiner is further configured to determine a category of each of the sub-regions according to the position of each of the sub-regions in the grayscale image, the category comprising: sub-regions located in four corners of the grayscale image, sub-regions located on the borders, except the four corners, of the grayscale image, and sub-regions located in other space, except on the borders, of the grayscale image; determine a mapping restriction parameter for each pixel in the sub-regions located in the four corners of the grayscale image as the transitional mapping restriction parameter of the transitional region it belongs to according to the determined transitional mapping restriction parameter of each of the transitional regions; determine a mapping restriction parameter for each pixel in the sub-regions located on the borders, except the four corners, of the grayscale image according to the determined transitional mapping restriction parameter of each of the transitional regions and according to a preset uni-linear interpolation calculation rule; and determine a mapping restriction parameter for each pixel in the sub-regions located in other space, except on the borders, of the grayscale image according to the determined transitional mapping restriction parameter of each of the transitional regions and according to a preset bi-linear interpolation calculation rule.

16. The image processing device according to claim 15, wherein the mapping restriction parameter determiner is further configured to calculate a mapping restriction parameter for each pixel in the sub-regions located on the borders, except the four corners, of the grayscale image by the following formula:

$$\lambda_{tr} = \frac{a \times L_n + b \times L'_n}{a + b}$$

Wherein, n is the serial number of the transitional region to which the pixel to be calculated belongs, t is the serial number of the sub-region to which the pixel to be calculated belongs, r is the serial number of the pixel to be calculated in the t-th sub-region, $L_n$ is the transitional mapping restriction parameter of the n-th transitional region, n' is the serial number of the transitional region located on the borders of the grayscale image and closest to the t-th sub-region, $L_n'$ is the transitional mapping restriction parameter of the n'-th transitional region, a is the distance between the pixel to be calculated and the median of the n'-th transitional region, b is the distance between the pixel to be calculated and the median of the transitional region to which it belongs, and $\lambda_{tr}$ is the mapping restriction parameter of the pixel to be calculated.

17. The image processing device according to claim 15, wherein the mapping restriction parameter determiner is further configured to calculate a mapping restriction parameter for each pixel in the sub-regions located in other space, except on the borders, of the grayscale image by the following formula:

$$T_{pz} = \frac{c \times L_x + d \times L'_x}{c + d}$$

$$T_{qz'} = \frac{c' \times L_m + d' \times L'_m}{c' + d'}$$

$$W_{pz} = \frac{g \times T_{pz} + h \times T_{qz'}}{g + h}$$

wherein, x is the serial number of the transitional region to which the pixel to be calculated belongs, p is the serial number of the sub-region to which the pixel to be calculated belongs, z is the serial number of the pixel to be calculated in the p-th sub-region, m is the serial number of the transitional region longitudinally adjacent to the x-th transitional region and closest to the p-th sub-region, q is the serial number of the sub-region adjacent to the p-th sub-region longitudinally and located in the m-th transitional region, z' is the serial number of a pixel located in the same column as the pixel to be calculated in the q-th sub-region, $L_x$ is the transitional mapping restriction parameter of the x-th transitional region, x' is the serial number of the transitional region horizontally adjacent to the x-th transitional region and closest to the p-th sub-region, $L_x'$ is the transitional mapping restriction parameter of the x'-th transitional region, $L_m$ is the transitional mapping restriction parameter of the m-th transitional region, m' is the serial number of the transitional region horizontally adjacent to the m-th transitional region and closest to the q-th sub-region, $L_m'$ is the transitional mapping restriction parameter of the m'-th transitional region, c is the distance between the pixel to be calculated and the longitudinal median of the x'-th transitional region, d is the distance between the pixel to be calculated and the longitudinal median of the transitional region to which it belongs, c' is the distance between the z'-th pixel in the q-th sub-region and the longitudinal median of the m'-th transitional region, d' is the distance between the z'-th pixel in the q-th sub-region and the longitudinal median of the transitional region to which it belongs, g is the distance between the pixel to be calculated and the horizontal median of the m-th transitional region, h is the distance between the pixel to be calculated and the horizontal median of the transitional region to which it belongs, $T_{pz}$ is a middle mapping restriction parameter of the pixel to be calculated, $T_{qz'}$ is a middle mapping restriction parameter of the z'-th pixel in the q-th sub-region, and $W_{pz}$ is a mapping restriction parameter of the pixel to be calculated.

18. The image processing device according to claim 15, wherein the grayscale adjustor is further configured to adjust a grayscale value of each pixel in the grayscale image by the following formula:

$$i'_y = \frac{\lambda_y \times S_y + i_y}{\lambda_y + 1}$$

Wherein, y is the serial number of a pixel, $i_y$ is the grayscale value of the y-th pixel in the grayscale image, $i_y'$ is the adjusted grayscale value of the y-th pixel in the grayscale image, $\lambda_y$ is a mapping restriction parameter of the y-th pixel, and $S_y$ is a mapping value of the y-th pixel.

19. A non-transitory computer readable storage medium, which stores computer readable instruction that cause a computer to perform a method according to claim 1 when executed by the computer.

20. A computer device, comprising:
- a memory configured to store computer executable instructions; and
- a processor configured to execute the computer executable instructions so as to perform a method according to claim 1.

* * * * *